E. CLARK.
HOUSING.
APPLICATION FILED AUG. 27, 1913.
1,104,876.
Patented July 28, 1914.
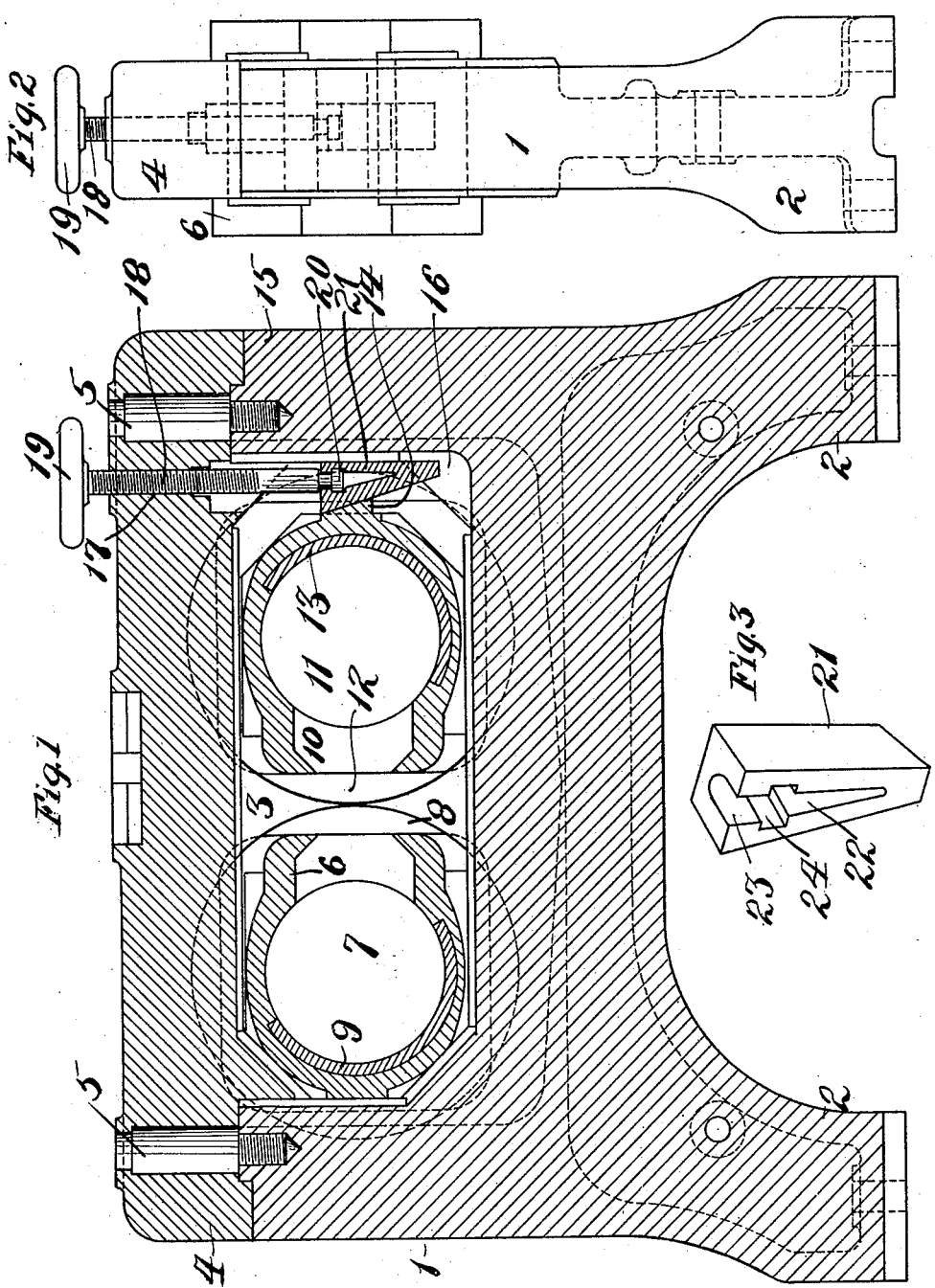
WITNESSES:
F. E. Shannon
A. L. McClintock
INVENTOR.
Elmer Clark
BY C. E. Humphrey
ATTORNEY.

UNITED STATES PATENT OFFICE.

ELMER CLARK, OF AKRON, OHIO, ASSIGNOR TO THE GOODYEAR TIRE AND RUBBER COMPANY, OF AKRON, OHIO, A CORPORATION OF OHIO.

HOUSING.

1,104,876.  Specification of Letters Patent.  Patented July 28, 1914.

Application filed August 27, 1913. Serial No. 786,916.

*To all whom it may concern:*

Be it known that I, ELMER CLARK, a citizen of the United States, residing at Akron, in the county of Summit and State of Ohio, have invented new and useful Improvements in Housings, of which the following is a specification.

This invention relates to improvements in housings for holding the bearings of rolls, such, for instance, as the mill rolls used in the rubber industry, in an adjusted position.

Briefly, the adjustment of bearings of the rolls, especially those used in the rubber manufacture, has heretofore been obtained by shifting the bearings of one roll with respect to the bearings of the other roll, and this shifting and the locking of the rolls in a determinate position has been effected by a screw which shifts the two bearings of one roll toward and away from the bearings of the other roll and lock them in position. The resistance of the material on which the rolls operate is often enormous and after use it is found to be almost impossible to turn the screw to effect the required shifting of one roll which is imperative, especially as the material becomes more finely comminuted. Also when the mass of material being worked by the rolls is too great, it has a tendency to break the rolls and injure the screws, so much so as to render their manipulation impossible.

With this brief history of the art, the object of this invention is to provide a frangible wedge, which in use cannot become jammed, to shift the position of one roll, and which when used will be crushed before the rolls are injured by the material, and thereby act as a safety device to prevent injury to the rolls, or, in other words, the wedges break down and relieve the rolls before the rolls themselves are injured.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a vertical sectional view taken longitudinally and centrally of a housing embodying this invention; Fig. 2, is an end elevation; and, Fig. 3, is a perspective view of a frangible wedge employed.

Referring to the drawings more specifically, the reference numeral 1 denotes a housing which is provided with supporting legs 2 and in its upper portion is a recess 3. The upper portion of the recess 3 is closed through the medium of a cap 4 held in place by hold-fast devices such as screws adapted to be inserted in the openings 5.

Mounted in the recess 3 is a bearing 6 for the cylindrical and reduced end 7 of a roll 8. The bearing 6 is provided with a bushing 9 and the entire bearing is stationary under ordinary circumstances and is adapted to engage the end of the recess as an abutment and is known as the stationary roll. Also mounted in the recess 3 is a shiftable bearing 10 to receive the reduced end 11 of a movable roll 12. This bearing is provided with the usual bushing 13 and is also provided on one face with an inclined lug 14. Extending vertically between the lug 14 and the side 15 of the housing is a space 16. Formed in alinement with the space 16 in the cap 14 is an interiorly-threaded opening 17 in which is a screw 18 provided at its upper end with a hand wheel 19 and at its lower end with a head 20.

Adapted to coöperate with the lug 14 is a wedge 21 provided with a chambered-out recess 22 having a contracted neck 23. The walls of the recess 22 correspond approximately with the side faces of the wedge 21 and it is provided with an enlargement 24 intermediate the ends thereof. This enlargement 24 is adapted to receive the head 20 of the screw 18 and the neck portion 23 to receive the contracted neck portion of the screw. When in position in the space 16 the flat face of the wedge will engage the finished face of the portion 15 of the housing while the inclined face of the wedge will engage the inclined face of the lug 14 and as the screw 18 is shifted, the rolls are shifted. By making the wedge hollow, as shown in the drawings, it provides a frangible element which will be crushed or broken to pieces by the lateral thrust of the rolls when an excess of work is put on them, thereby constituting a safety device to prevent their injury.

I claim:—

An improved housing, comprising a body having a recess therein, roll bearings mounted in said recess, one of said bearings being shiftable with relation to the other bearing, and being formed with a projection having an inclined face, a hollow frangible wedge slidable upon said inclined face, and provided with a chambered recess having a contracted neck, and an enlarged portion, and a screw extending through said neck and having a head on its lower end movable within said enlarged portion of the recess in the wedge, and a handle wheel at its upper end.

In testimony whereof I have hereunto set my hand in presence of two subscribing witnesses.

ELMER CLARK.

Witnesses:
H. B. HAMLEN,
H. J. LONG.

Copies of this patent may be obtained for five cents each, by addressing the "Commissioner of Patents, Washington, D. C."